United States Patent [19]
Asoh

[11] Patent Number: 4,886,312
[45] Date of Patent: Dec. 12, 1989

[54] AUTOMOBILE REAR BODY STRUCTURE
[75] Inventor: Seiiti Asoh, Higashihiroshima, Japan
[73] Assignee: Mazda Motor Corporation, Hiroshima, Japan
[21] Appl. No.: 295,792
[22] Filed: Jan. 11, 1989
[30] Foreign Application Priority Data
  Jan. 11, 1988 [JP] Japan .................... 63-4400
[51] Int. Cl.4 .................. B60J 1/18; B62D 25/10
[52] U.S. Cl. ...................... 296/76; 296/146; 296/195; 296/91
[58] Field of Search .................... 296/76, 195, 146
[56] References Cited
  U.S. PATENT DOCUMENTS
  2,996,210  8/1961  Thomas .................... 296/76
  4,184,709  1/1980  Kim .................... 296/146
  4,413,854 11/1983  Hirshberg .................... 296/146
  4,688,844  8/1987  Hirose et al. .................... 296/76
  4,801,174  1/1989  Hirshberg .................... 296/146

FOREIGN PATENT DOCUMENTS
  62-79616  5/1987  Japan .................... 296/146

Primary Examiner—Robert R. Song
Attorney, Agent, or Firm—Wenderoth, Lind & Ponack

[57] ABSTRACT

In an automobile rear body structure, a rear windshield glass is separated into two at a predetermined height. The upper half of the rear windshield glass is fixedly connected to a pair of rear pillars disposed on both sides of the rear body structure and to a roof panel to which a rear header extending in a direction widthwise of an automobile vehicle is rigidly secured for reinforcement of the roof panel. The lower half of the rear windshield glass is fixedly connected to a trunk lid, which is hingedly connected to the rear pillars for opening or closing a trunk room. Such a construction provides a relatively wide opening through which various luggages can be readily loaded in or unloaded from the trunk room.

14 Claims, 10 Drawing Sheets

AUTOMOBILE REAR BODY STRUCTURE

BACKGROUND OF THE INVENTION

1. Field of the Invention

The present invention generally relates to an automobile rear body structure, and more particularly, to an automobile rear openable structure such as a back door which covers a rear portion of an automobile vehicle and can be opened with respect thereto.

2. Description of the Prior Art

Conventionally, there have been proposed various kinds of automobile rear openable structures. Some of them are of a type in which only a trunk lid can be opened with respect to a rear portion of an automobile vehicle. Some of the others are of a type in which both of the trunk lid and a rear windshield glass can be opened with respect to the rear portion of the automobile vehicle.

The Japanese Utility Model Laid-Open Application No. 62-79616 discloses a back door of an automobile vehicle which can be opened in two steps. A luggage door alone or together with a rear windshield glass can be opened as occasion demands. The luggage door is hingedly connected at its upper end with a lower end of the rear windshield glass, which is further hingedly connected at its upper end with a rear header. The luggage door corresponds to the trunk lid.

Such a structure can provide a relatively wide opening when the back door is opened. However, this kind of structure is disadvantageous in that various members tend to be collected on the rear header in order to raise the rigidity thereof. The reason for this is that the rear header acts as a fulcrum of the back door when opened. Accordingly, the distance between the rear header and a person occupying a rear seat i.e., the head clearance is disadvantageously reduced.

Furthermore, since the back door becomes long and heavy, an auxiliary means, for example, a damper stay or the like required for opening the back door inevitably becomes large-sized, resulting in an increased cost. Besides, the rear windshield glass is thickened to be raised in rigidity, resulting undesirably in its increased weight and cost.

On the other hand, conventional automobile vehicles of the sedan style in which only the trunk lid can be opened have an ample head clearance. However, the automobile vehicles of this kind are disadvantageous in that the trunk lid can not ensure a sufficient opening for loading and unloading luggages.

SUMMARY OF THE INVENTION

Accordingly, the present invention has been developed with a view to substantially eliminating the above described disadvantages inherent in the prior art automobile rear body structure, and has for its essential object to provide an improved automobile rear body structure which facilitates the loading and unloading of luggages through an opening formed therein, as in an automobile vehicle of the hatchback style, and ensures an ample head clearance of a person occupying a rear seat, as in an automobile vehicle of the sedan style.

Another important object of the present invention is to provide an automobile rear body structure of the above described type which is improved also in appearance.

In accomplishing these and other objects, an automobile rear body structure according to one preferred embodiment of the present invention is comprised of a pair of rear pillars disposed on both sides of the rear body structure, a rear header rigidly secured to a rear portion of a roof panel and extending in a direction widthwise of an automobile vehicle, an openable structure hingedly connected to the rear pillars for opening or closing a luggage compartment, and a rear windshield glass separated, at a predetermined height, into two, upper and lower glass portions. The upper glass portion is fixedly connected to the rear pillars and to the rear portion of the roof panel reinforced by the rear header whereas the lower glass portion is fixedly connected to the openable structure.

In another aspect of the present invention, the automobile rear body structure is further provided with a rear spoiler disposed along and spaced form a parting portion between the upper and lower glass portions.

According to the present invention, the lower half of the rear windshield glass can be opened together with the rear openable structure. Such a construction provides a sufficiently wide opening which enables luggages to be readily loaded in or unloaded from a luggage compartment.

Moreover, since the upper half of the rear windshield glass is secured to the roof panel reinforced by the rear header and to the rear pillars, any other structures never be collected on the rear header. Accordingly, the rear header is not required to be increased in height and an ample head clearance is desirably kept above a person occupying a rear seat. The rear body structure of the present invention, therefore, has advantages inherent not only in an automobile vehicle of the sedan style but in that of the hatchback style.

In addition, according to the present invention, the rear spoiler prevents a slit of the parting portion of the rear windshield glass from being viewed from outside, rendering this portion to be improved in appearance.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Figure 1:
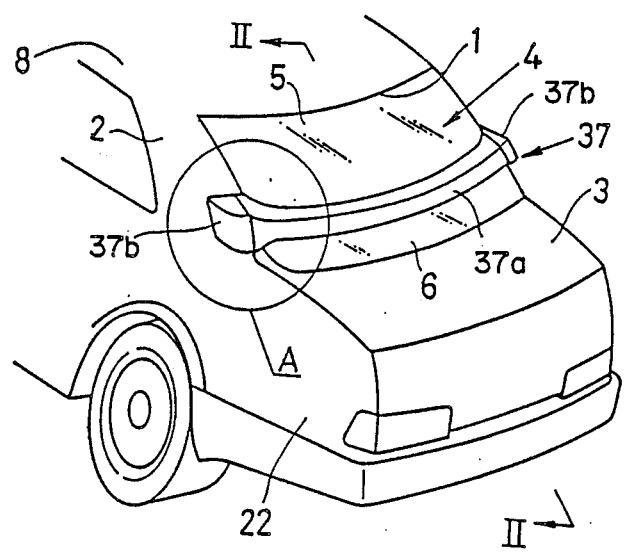
FIG. 1 is a fragmentary perspective view of an automobile rear body structure according to one preferred embodiment of the present invention.
Figure 2:
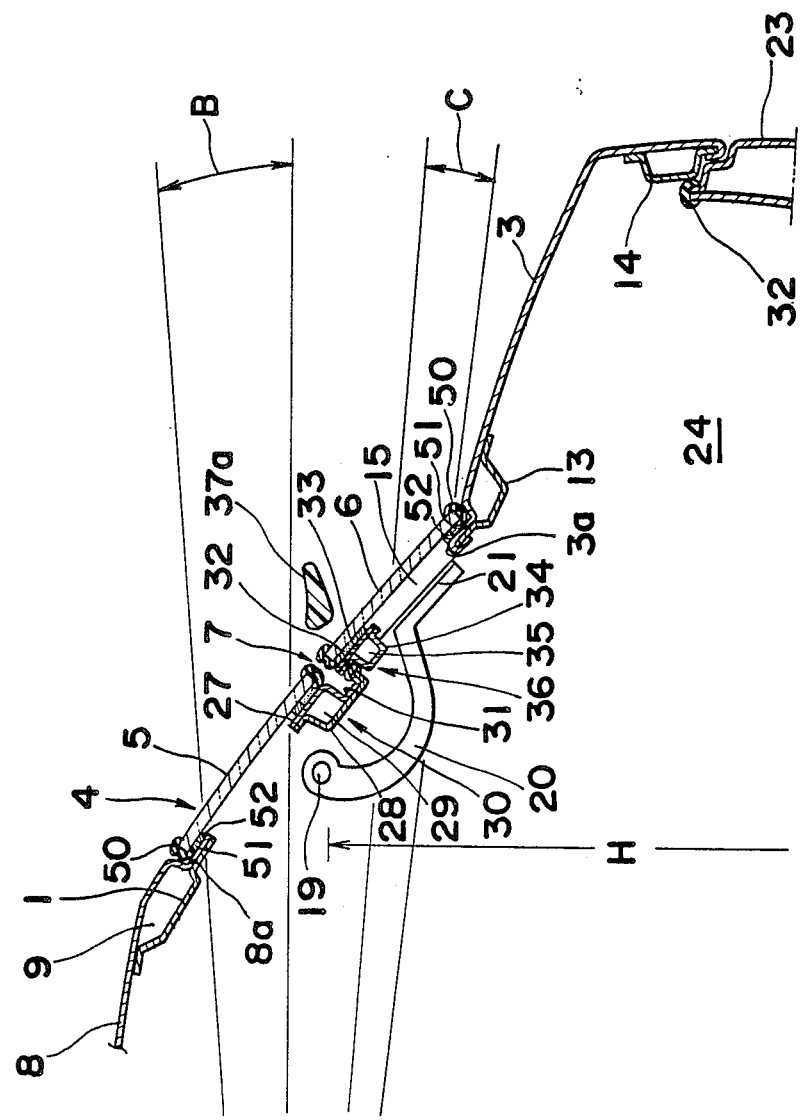
FIG. 2 is a section taken along line II—II in FIG. 1.
Figure 3:
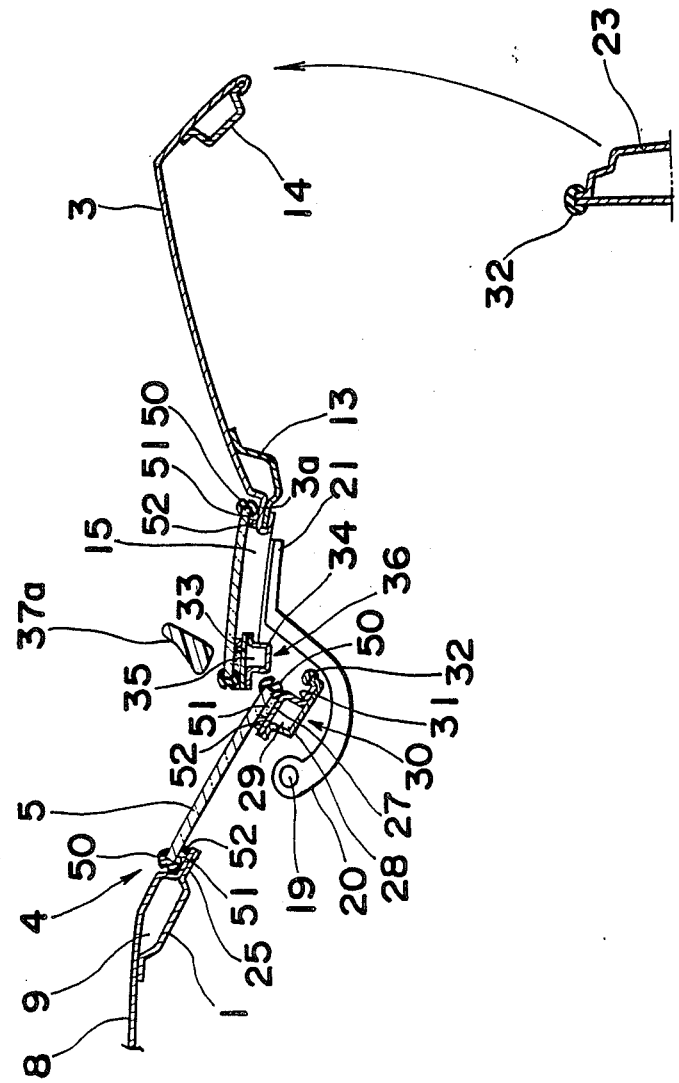
FIG. 3 is a fragmentary sectional view of the rear body structure of FIG. 1 when a trunk lid is opened.

Referring first to FIGS. 1 to 3, an automobile rear body structure is generally comprised of a rear header 1 rigidly secured to a roof panel 8, a pair of rear pillars 2 disposed on both sides of a rear portion of an automobile vehicle, a trunk lid 3 covering a trunk room as a luggage compartment and a rear windshield glass 4 encircled by these members.

The rear windshield glass 4 is separated into two, upper and lower glass portions 5 and 6, at a location substantially corresponding to a height H required to provide a sufficient opening for loading in or unloading from the trunk room therethrough in an automobile vehicle of the hatchback style. A slight clearance needed for opening or closing the trunk room is formed at a glass parting portion 7 between the upper and lower glass portions 5 and 6.

The rear header 1 extends in a direction widthwise of the automobile vehicle and is rigidly secured to a lower surface of the rear end of the roof panel 8 so that a closed section 9 may be formed between the rear header 1 and the roof panel 8.

Figure 4:
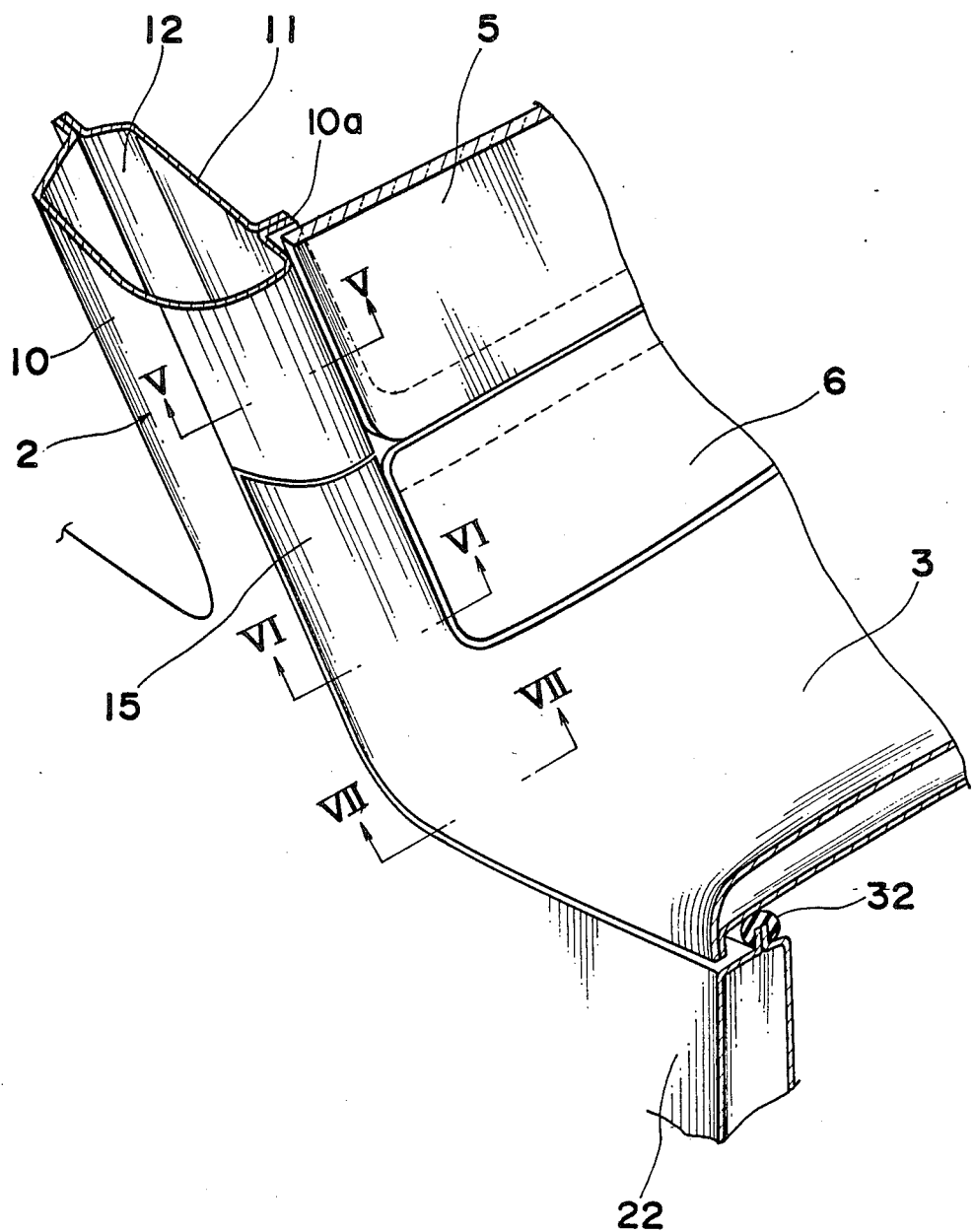
FIG. 4 is a fragmentary perspective view, partly in section, of a portion of the rear body structure of FIG. 1.
Figure 5:
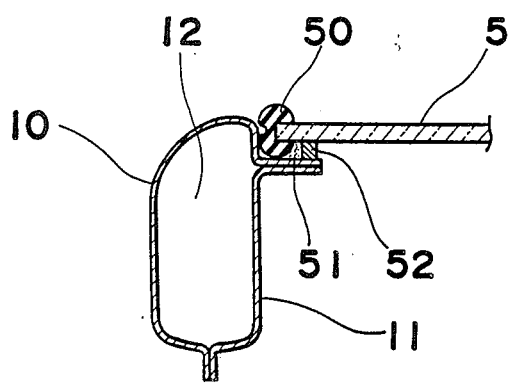
FIG. 5 is a section taken along line V—V in FIG. 4 or in FIG. 9.

FIG. 4 depicts part of the rear body structure according to the present invention. As shown in FIG. 4, each rear pillar 2 is comprised of a rear pillar outer panel 10 and a rear pillar inner panel 11, both of which are rigidly secured to each other and between which a closed section 12 is formed.

The trunk lid 3 is provided at its front and rear ends with reinforcements 13 and 14 rigidly secured thereto and on both side portions of its front end with two upwardly extending portions 15 which are integrally formed therewith and opposed to the rear pillars 2.

Figure 12:
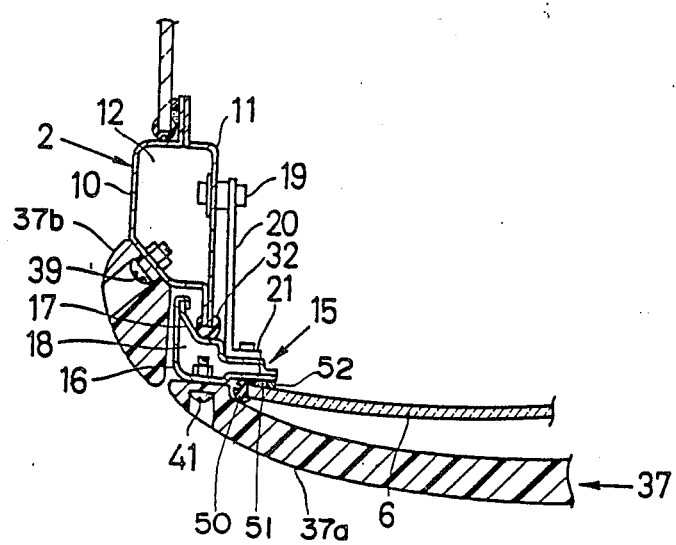
FIG. 12 is a horizontal sectional view of a portion A in FIG. 1.
Figure 13:
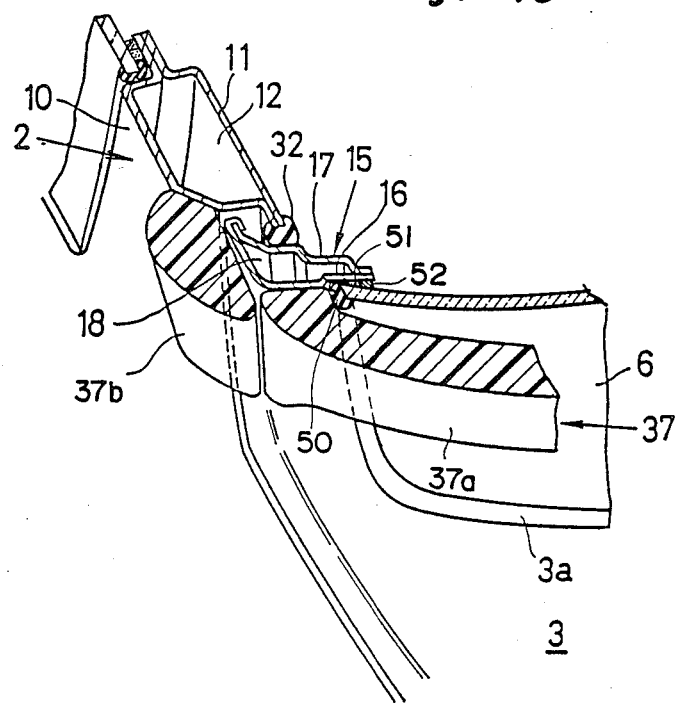
FIG. 13 is a perspective view of FIG. 12.

As shown in FIGS. 12 and 13, each of these extending portions 15 of the trunk lid 3 is comprised of a lid outer panel 16 and a lid inner panel 17, between which a closed section 18 is formed.

Two swan hinges 20 are pivotaly connected at their pivot ends with the corresponding rear pillar inner panels 11 at a predetermined height by means of respective hinge pins 19. Furthermore, each swan hinge 20 is securely bolted at a bent portion of its free end to the corresponding upwardly extending portion 15 of the trunk lid 3. Such a construction provides a relatively wide opening for the trunk room, which is defined by the openable trunk lid 3, right and left rear fender panels 22 and a rear end panel 23.

As shown in FIGS. 2 and 4, the upper glass portion 5 is fixedly connected with the roof panel 8 and both the rear pillars 2. More specifically, the upper glass portion 5 is fixed to a rear flange 8a of the roof panel 8 and to inwardly protruding flanges 10a of the rear pillar outer panels 10. The upper glass portion 5 is provided at its lower end with a cross member 30 which is rigidly secured thereto and extends widthwise between both the rear pillars 2. The cross member 30 is comprised of an outer cross member 27 and an inner cross member 28, between which a closed section 29 is formed.

Figure 8:
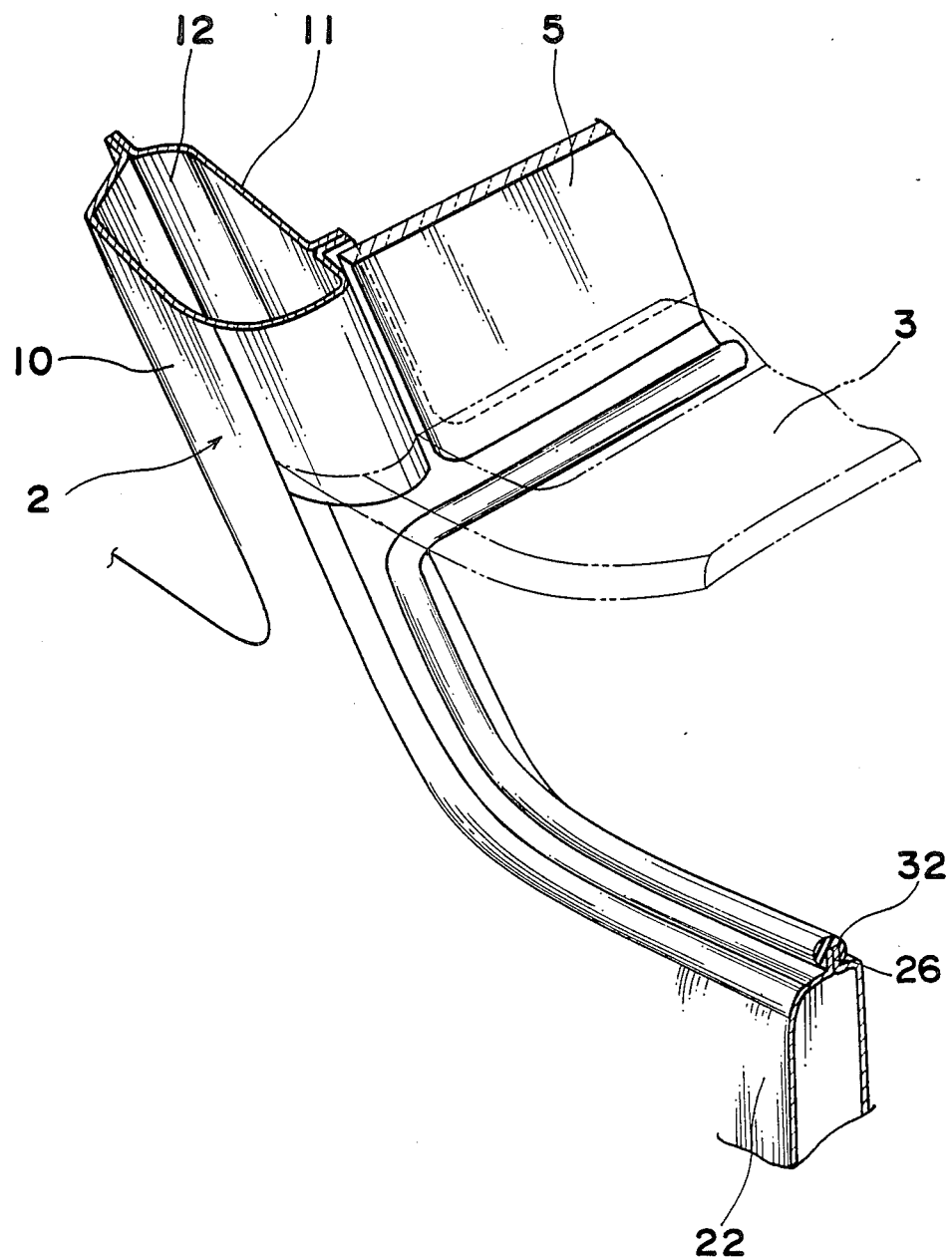
FIG. 8 is a view indicative of a state in which the trunk lid shown in FIG. 4 is opened.

The cross member 30 forms a concave rain-rail 31 at a location confronting the glass parting portion 7 between the upper and lower glass portions 5 and 6. A seal rubber 32 is attached on an upwardly bent lower end of the rain-rail 31 for the purpose of sealing between the rain rail 31 and the lower glass portion 6. This seal rubber 32 is, as shown in FIG. 8, of a one-piece construction and is also attached on upwardly protruding flanges 26 of the rear pillars 2, the rear fender panels 22 and the rear end panel 23 so as to encircle the opening of the trunk lid 3.

Figure 6:
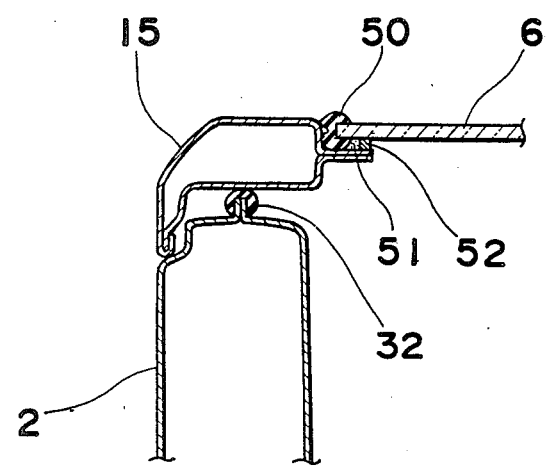
FIG. 6 is a section taken along line VI—VI in FIG. 4.
Figure 7:
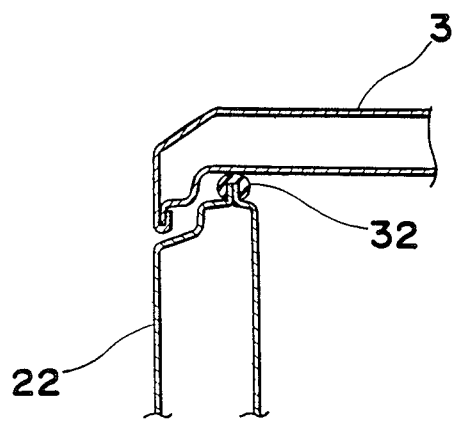
FIG. 7 is a section taken along line VII—VII in FIG. 4.

The lower glass portion 6 is securely connected to a front end bent portion 3a of the trunk lid 3 and to both the upwardly extending portions 15 of the trunk lid 3, as shown in FIGS. 2, 3 and 6.

The lower glass portion 6 is provided at its upper end with a frame member 36 which extends widthwise inside the upwardly extending portions 15 of the trunk lid 3 and is comprised of an outer frame 33 and an inner frame 34. The frame member 36 acts as a reinforcement and has a closed section 35 between the outer and inner frames 33 and 34.

The rear windshield glass 4 comprised of the upper and lower glass portions 5 and 6 is of a watertight construction, since both of the glass portions 5 and 6 are secured to their surrounding structures through moldings 50, adhesives 51 and dams 52, as shown in FIGS. 2, 3, 5 and 6.

A rear spoiler 37 is disposed along and spaced from the glass parting portion 7 of the upper and lower glass portions 5 and 6. As shown in FIGS. 1, 12 and 13, the rear spoiler 37 is comprised of three members, a main spoiler 37a and a pair of side spoilers 37b. The main spoiler 37a is rigidly secured at its opposite ends to the upwardly extending portions 15 of the openable trunk lid 3 by means of paired bolts and nuts 41. Each of the side spoilers 37b is rigidly secured to the fixed rear pillar outer panel 10 by means of paired bolts and nuts 39.

The rear body structure having the above described construction works as follows.

After the trunk lid 3 has been released from its closed position shown in FIG. 2, it can be opened, through the swan hinges 20, up to its open position shown in FIG. 3. In this event, both the lower glass portion 6 and the main spoiler 37a are opened together with the trunk lid 3, since these members are securely connected to one another. As clearly shown in FIGS. 3 and 8, an ample opening is ensured by opening the lower glass portion 6 together with the trunk lid 3 and enables luggages to be readily loaded in or unloaded from the trunk room.

As described above, the upper glass portion 5 is fixedly connected to part of the rear body structure i.e., the rear pillars 2 and the roof panel 8 to which the rear header 1 is rigidly secured. Accordingly, other structures are not required to be concentrated on the rear header 1. It is, therefore, not necessary to increase the rear header 1 in height, resulting in a sufficient head clearance for the person occupying a rear seat. This fact provides advantages inherent in both an automobile vehicle of the sedan style and that of the hatchback style.

Besides, the rear spoiler 37 disposed in the vicinity of the glass parting portion 7 hides a slit thereof and prevents this portion 7 from being viewed from outside. In this way, the glass parting portion 7 is improved in appearance.

In addition, when the trunk lid 3 is in its closed position shown in FIG. 2, visibility from the driver's seat towards the rear side can be generally ensured through upper and lower areas B and C defined by respective glass portions 5 and 6.

Moreover, water such as rain water or the like entering through the glass parting portion 7 is led into the rain rail 31 disposed therealong and is spontaneously discharged outside.

Figure 9:
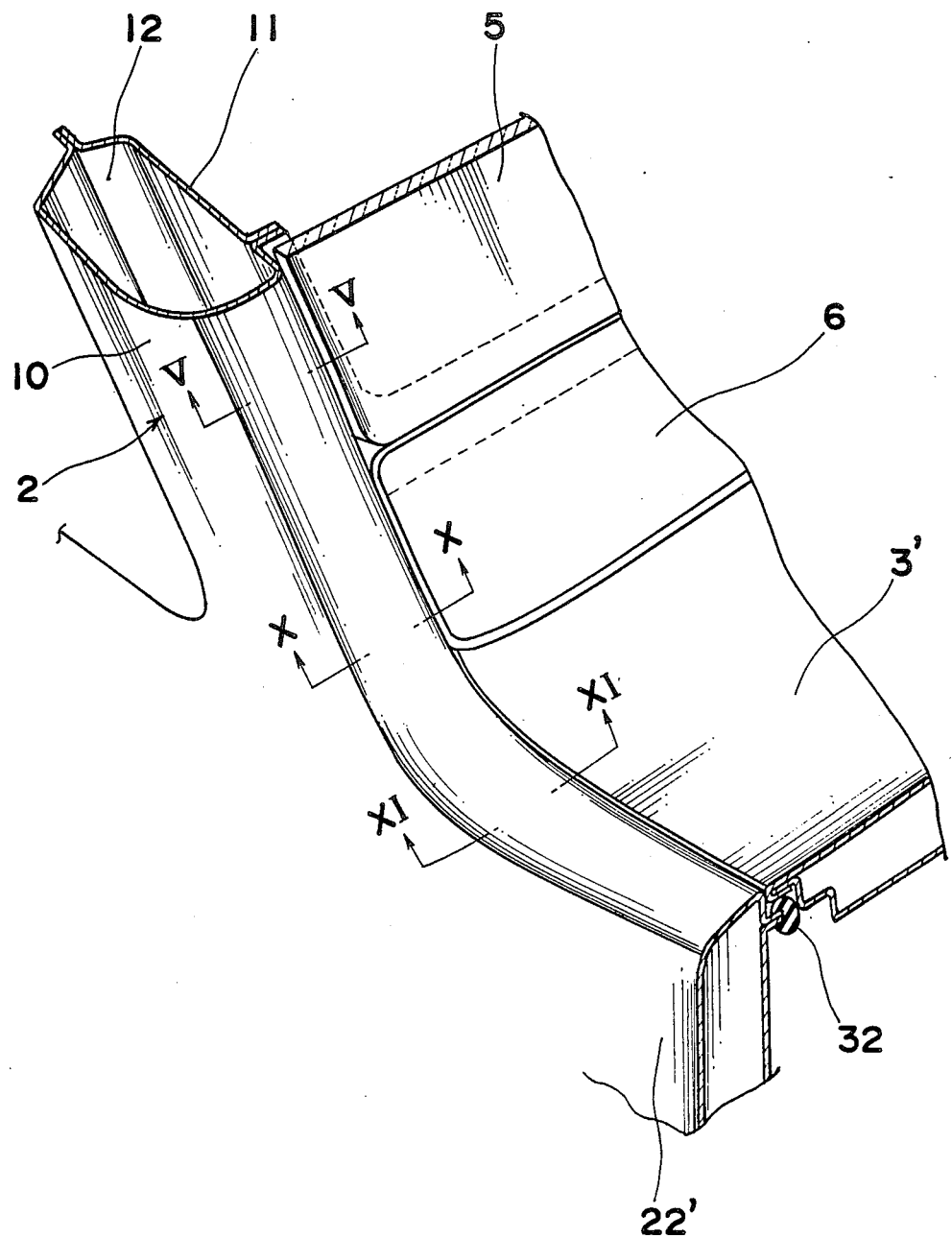
FIG. 9 is a view similar to FIG. 4, which particularly shows a modification thereof.
Figure 10:
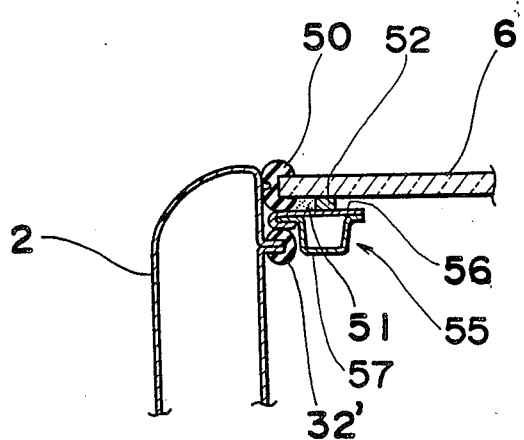
FIG. 10 is a section taken along line X—X in FIG. 9.
Figure 11:
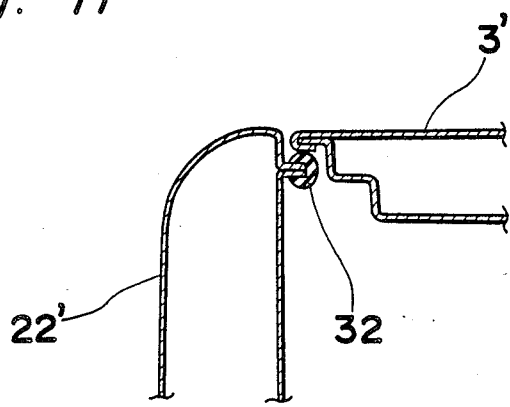
FIG. 11 is a section taken along line XI—XI in FIG. 9.

FIGS. 9 to 11 depicts a modification of the automobile rear body structure described above.

In this modification, rear fender inner and outer panels constituting each of the right and left rear fender panels 22' are rigidly secured to each other through their respective inwardly protruding flanges on which a seal rubber 32 is attached.

As shown in FIG. 10, the trunk lid 3' is provided on both sides thereof with two upwardly extending frame members 55 which extend along and inside the rear pillars 2 and are each comprised of outer and inner frame members 56 and 57. The lower glass portion 6 is secured to these frame members 55 through moldings 50, adhesives 51 and dams 52.

Figure 14:
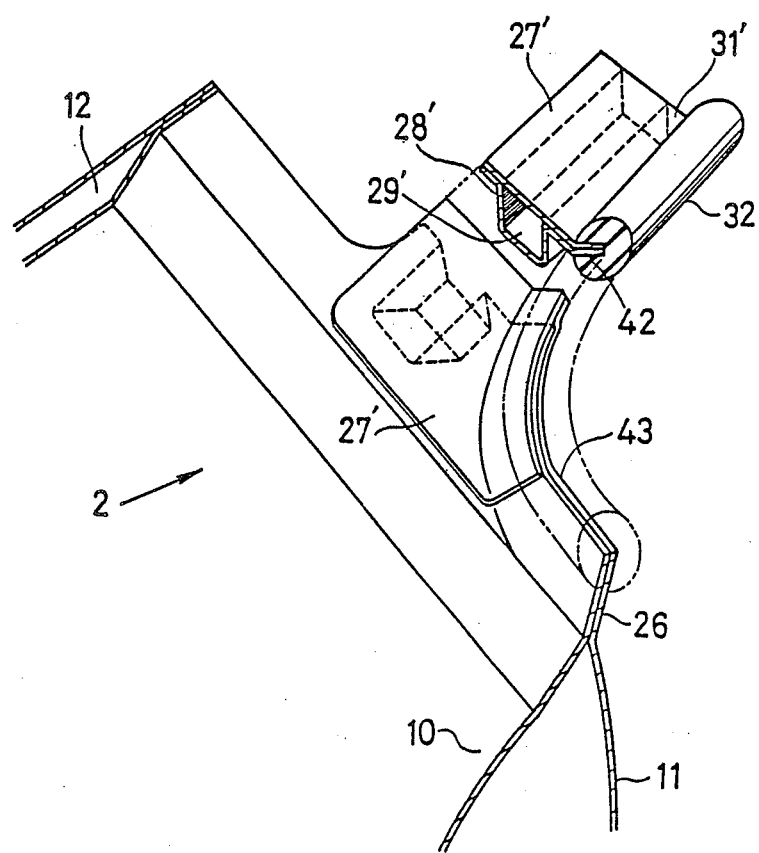
FIG. 14 is a fragmentary perspective view, partly in section, of one of junctions between a reinforcement for the upper half of a rear windshield glass and rear pillars.

FIG. 14 depicts a modification of junctions between the reinforcement of the upper glass portion 5 and the rear pillars 2. In this modification, the connecting portion for connecting the rear pillar outer and inner panels 10 and 11 is further extended inwards by a predetermined length. This extended portion is rigidly secured at its upper surface to the outer cross member 27', which is further rigidly secured at its lower surface to the inner cross member 28'. A closed section 29' is formed between the outer and inner cross members 27' and 28'. A one-piece seal rubber 32 is attached on rear bent portions 42 of respective cross members 27' and 28', upwardly protruding flanges 26 of the rear pillars 2 and the like. The upper surface of the outer cross member 27' acts as the rain rail 31'.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile rear body structure comprising:
   a pair of rear pillars disposed on both sides of the rear body structure;
   a rear header adapted to be rigidly secured to a roof panel and extending in a direction widthwise of an automobile vehicle;
   an openable structure hingedly connected to said rear pillars for opening or closing a luggage space; and
   a rear windshield glass separated into two at a predetermined height and comprising;
      an upper glass portion secured to said rear pillars and to said roof panel reinforced by said rear header; and
      a lower glass portion secured to said openable structure.

2. The structure according to claim 1, wherein said openable structure comprises a trunk lid for covering a trunk room.

3. The structure according to claim 1, wherein said upper glass portion is provided at its lower edge with a cross member which is rigidly secured thereto and extends between said rear pillars.

4. The structure according to claim 3, wherein said cross member comprises an outer cross member and an inner cross member and forms a closed section between said outer and inner cross members.

5. The structure according to claim 4, wherein a rain rail is integrally formed with said cross member.

6. The structure according to claim 5, wherein said rain rail is provided at its lower end with a seal member for sealing between said rain rail and said lower glass portion.

7. An automobile rear body structure comprising:
   a pair of rear pillars disposed on both sides of the rear body structure;
   a rear header adapted to be rigidly secured to a roof panel and extending in a direction widthwise of an automobile vehicle;
   an openable structure hingedly connected to said rear pillars for opening or closing a luggage space;
   a rear windshield glass separated into two at a predetermined height and comprising;
      an upper glass portion secured to said rear pillars and to said roof panel reinforced by said rear header; and
      a lower glass portion secured to said openable structure; and
   a rear spoiler disposed along and spaced from a parting portion between said upper and lower glass portions.

8. The structure according to claim 7, wherein said rear spoiler comprises a main spoiler and a pair of side spoilers.

9. The structure according to claim 7, wherein said rear spoiler is rigidly secured to said openable structure.

10. The structure according to claim 8, wherein said main spoiler is rigidly secured to said openable structure.

11. The structure according to claim 8, wherein said side spoilers are rigidly secured to said rear pillars, respectively.

12. The structure according to claim 10, wherein said openable structure comprises a trunk lid having a pair of upwardly extending portions on both sides thereof and said main spoiler is rigidly secured to said upwardly extending portions.

13. The structure according to claim 12, wherein both said openable structure and said lower glass portion can be opened or closed together with respect to said luggage space through at least one swan hinge.

14. The structure according to claim 13, wherein said swan hinge has one end pivotally connected to one of said rear pillars and the other end securely bolted to one of said upwardly extending portions of said trunk lid.

* * * * *